United States Patent
Yamada

(10) Patent No.: US 8,676,358 B2
(45) Date of Patent: Mar. 18, 2014

(54) NUMERICAL CONTROL METHOD AND NUMERICAL CONTROL DEVICE

(75) Inventor: Yoshinori Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 616 days.

(21) Appl. No.: 12/992,198

(22) PCT Filed: May 13, 2008

(86) PCT No.: PCT/JP2008/058760
§ 371 (c)(1),
(2), (4) Date: Jan. 11, 2011

(87) PCT Pub. No.: WO2009/139046
PCT Pub. Date: Nov. 19, 2009

(65) Prior Publication Data
US 2011/0088523 A1    Apr. 21, 2011

(51) Int. Cl.
*G06F 19/00* (2011.01)
(52) U.S. Cl.
USPC .............................................. 700/83; 700/17
(58) Field of Classification Search
USPC ................ 700/83, 17; 82/1.11; 318/569, 594; 630/73.02
See application file for complete search history.

(56) References Cited

U.S. PATENT DOCUMENTS

| | | | | |
|---|---|---|---|---|
| 4,970,449 A | * | 11/1990 | Kawamura et al. | 318/569 |
| 5,260,631 A | * | 11/1993 | Hayashida et al. | 318/594 |
| 5,497,277 A | * | 3/1996 | Takahashi | 360/73.03 |
| 5,841,604 A | * | 11/1998 | Supino | 360/73.03 |
| 5,999,357 A | * | 12/1999 | Serrano | 360/73.02 |
| 6,404,160 B2 | | 6/2002 | Sagasaki et al. | |
| 2002/0003416 A1 | | 1/2002 | Sagasaki et al. | |

FOREIGN PATENT DOCUMENTS

| | | |
|---|---|---|
| JP | 03-239402 A | 10/1991 |
| JP | 03-239403 A | 10/1991 |
| JP | 8-202420 A | 8/1996 |
| JP | 10-201279 A | 7/1998 |
| JP | 10-232705 A | 9/1998 |
| WO | 00-39646 A1 | 7/2000 |

OTHER PUBLICATIONS

International Search Report issued in PCT/JP2008/058760, dated Jun. 24, 2008.
Written Opinion (PCT 237), issued in PCT/JP2008/058760, dated Jun. 24, 2010.

* cited by examiner

Primary Examiner — Kidest Bahta
(74) Attorney, Agent, or Firm — Sughrue Mion, PLLC

(57) ABSTRACT

A numerical control machine tool has two spindles mounted in opposition to each other. In order to enable consecutive operations of lathe turning machining work in accordance with a speed command, drill machining work for drilling with rotating tools with a work positioned at a given angle, and other machining works while keeping a state where a single work is grasped by both of the spindles, switching means 152, 215 and 225 are provided which switch a reference spindle 314 to a profile control axis in a state where both of the spindles are held in the position control mode selected during spindle synchronized control, in a case where a C-axis control switching command is issued to treat the reference spindle 314 as the profile control axis while spindle synchronized control is performed for the reference spindle 314 and a synchronized spindle 324 and the synchronized spindle 324 is revolving at a command speed given to the reference spindle 314.

8 Claims, 10 Drawing Sheets

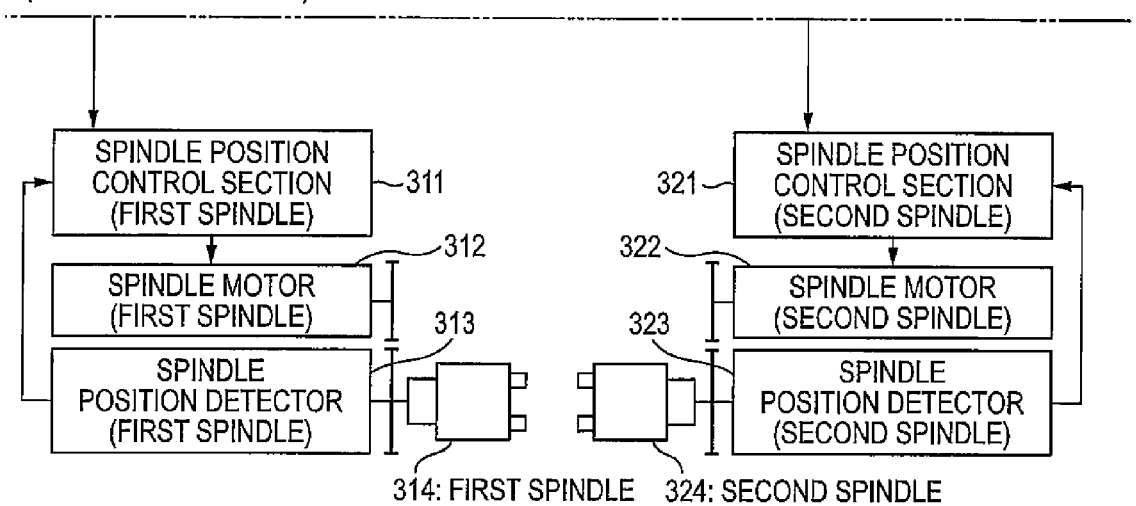

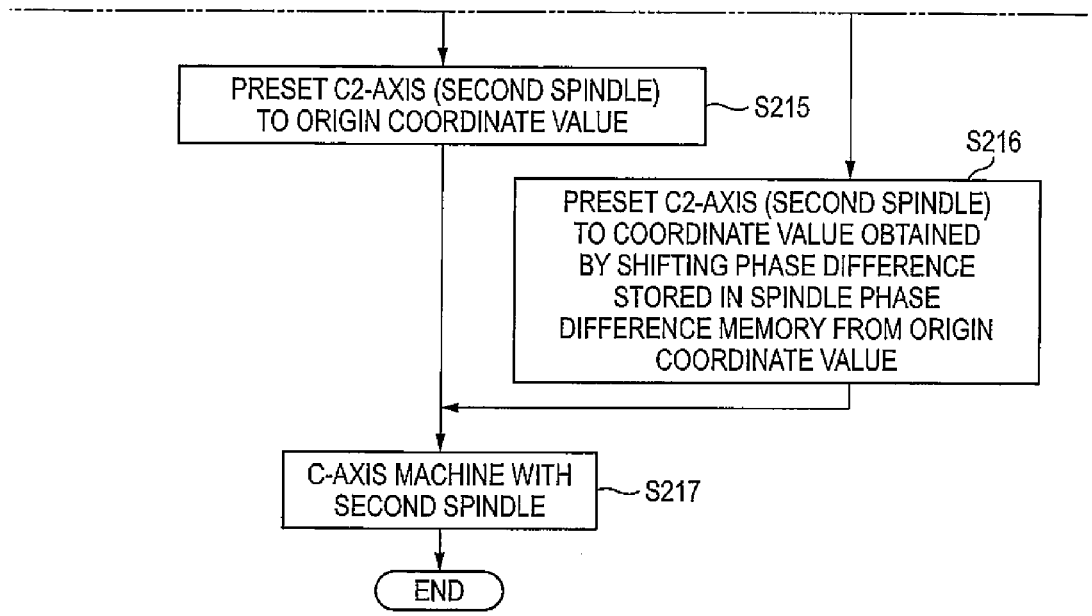

NUMERICAL CONTROL METHOD AND NUMERICAL CONTROL DEVICE

TECHNICAL FIELD

The present invention relates to a numerical control (NC) method capable of controlling a spindle position and device thereof. Especially, the present invention relates to a synchronizing control between spindles of a NC lathe, which provided with oppositely arranged first and second spindles, in order to perform a machining work while both spindles grasp a single work.

BACKGROUND

FIG. 8 is a main block diagram for a related art NC device. The NC device 101 includes an analytical processing section 111, an interpolating control section 112, a ladder circuit section 121, a mechanical control signal processor section 122, axis control sections 211, 221, and a spindle synchronized control section 151. The analytical processing section 111 performs analytical processes of machining work programs. Examples of the machining work programs are a positioning command like a positioning command for a contour control axis (NC axis), a command for cutting feed, or the like, a speed command for a spindle, a supplemental command for a machine control, and the like. The interpolating control section 112 receives a result of the analytical process and generates an interpolating positioning pulse or a speed command for the spindle. The generated interpolating positioning pulse or the generated speed command is transmitted to the axis control sections 211, 221 by which the spindles corresponding to the pulse or the speed command are controlled respectively. The ladder circuit section 121 performs a supplemental command control after an input supplemental command code is transmitted to the mechanical control signal processor section 122 through the interpolating control section 112. Although the NC device 101 includes a control section for controlling the NC axis such as X axis and the Z axis or the like, FIG. 8 shows only the axis control section 211 for the first spindle 314 and the axis control section 221 for the second spindle 324 for the sake of simplicity.

A spindle motor 312 drives the first spindle 314. The position and the speed of the spindle motor 312 control the position and the speed of the first spindle 314. A spindle position controller 311 controls the position and the speed of the spindle motor 312 based on the position feedback signal detected by a spindle position detector 313. A spindle motor 322 drives the second spindle 324. The position and the speed of the spindle motor 322 control the position and the speed of the second spindle 314. A spindle position controller 321 controls the position and the speed of the spindle motor 322 based on the position feedback signal detected by a spindle position detector 323.

The spindle of the related art NC device 101 is controlled so as to rotate regularly and reversely in a commanded speed based on the speed command, a regular rotation signal, and a reverse rotation signal. The speed command for the spindle is generated by the interpolating control section 112 based on an S command of a machining work program. The regular rotation signal and the reverse rotation signal for the spindle are output through the interpolating control section 112, the ladder circuit section 121, and the mechanical control signal processing section 122 based on M3 and M4 command of the machining work program.

A c-axis selection signal 123 for the spindle output to the mechanical control signal processing section 122 switches the spindle to a NC axis performing positioning, cutting feed or the like based on the positioning command. The c-axis selection signal 123 is generated, for example, by a M18 command of the machining work program. The NC axis of the spindle performs contour controls while cooperating with NC axes (x axis, z axis, or the like) driving a turning tool stage or the like. In a case where controlling the position of the first spindle 314 as a NC axis (referred to as a c-axis controlling position control mode), the spindle c-axis control switching section 212 for the first spindle 314 switches the axis control from the spindle control section 213, which controls the spindle based on the speed command, to the NC axis control section 214, which controls the NC axis based on the interpolating positioning pulse output from the interpolating control section 112 by outputting the c-axis selection signal 123 corresponding to the first spindle 314.

Following above described switching, a mode of the spindle position control section 311 is switched from the spindle control mode, in which the spindle position control section 311 controls speed, to the c-axis controlling position control mode, in which the spindle position control section 311 controls position by a position loop gain specialized for c-axis control. After the switching, the interpolating positioning pulse for each NC axis is generated so that commanded positions of one or a plurality of NC axes interpolatingly moves in relation to the position command and the feeding speed command commanded by the machining work program. The interpolating positioning pulse output to the NC axis corresponding to the first spindle 314 is processed in the NC axis control section 214 by acceleration and deceleration process or the like. The NC axis control section 214 outputs a positioning command corresponding to the spindle positioning control section 311 so as to control the position. The above described control enables a c-axis machining work such as drilling or milling on a side surface (peripheral surface) of a work with a rotational tool.

A NC axis synchronizing control section 113 controls the NC axis synchronously with another NC axis by synchronously outputting the interpolating positioning pulse for the NC axis based on the positioning command commanded by the machining work program to another NC axis. For example, in a case where the position of the first spindle 314 is controlled as a c1-axis and the position of the second spindle 324 is controlled as a c2-axis after switching to the c-axis controlling position control mode, when positioning the c1-axis and the c2-axis at given positions respectively and controlling the c2-axis synchronously with the c1-axis, the c2-axis moves synchronously with the c1-axis in a same amount as the c1-axis moves. The NC work machine provided with the first spindle 314 and the second spindle 324 which are arranged oppositely enables to perform machining work (drilling, milling or the like) on the side surface of a single work while positioning the work at a given angle in a state where the first spindle 314 and the second spindle 324 both grasp the work because of the NC axis synchronized control for the c2-axis. In the synchronized control, the c2-axis synchronize the positioning command for the c1-axis so as to rotate in a same direction as the c1-axis rotates by assigning NC axis sync-polarity reversely after positioning the c1-axis and the c2-axis at the given angle and both grasp the single work.

In a case where the spindle control mode where the speed of the spindle is controlled by rotating the spindle by the speed command is selected instead of controlling the position of the spindle as a NC axis (a axis performing positioning, cutting feed, or the like based on the positioning command), when the spindle synchronized control command is commanded by the machining work program or the like, the control mode is switched to the spindle synchronous control positioning control mode where the positions of a master spindle (a reference spindle) and a slave spindle (synchronized spindle) are controlled by a position loop gain specialized for the spindle synchronous control. The reference spindle is a reference of the synchronous control and the synchronized spindle moves synchronously with the reference spindle. In the spindle synchronous control positioning control mode, the position of the reference axis is controlled based on a spindle synchronizing positioning command which is generated by integrating a given speed command.

The synchronized spindle rotates in a synchronized speed since the spindle synchronized control section 151 controls the synchronized spindle so as to synchronize with the reference spindle in terms of rotation by outputting the spindle synchronizing positioning command for the reference spindle to the synchronized spindle. Accordingly, the NC work machine provided with the first spindle 314 and the second spindle 324 which are arranged oppositely enables to do cutting works while grasping a single work from both sides.

When a phase matching command is also commanded in the spindle synchronizing control command, a phase matching is performed at the spindle side so that the phase difference between the spindles is a given angle. Therefore, the NC work machine provided with the first spindle 314 and the second spindle 324 which are arranged oppositely enables to pass a work from the first spindle 314 to the second spindle 324 while each spindle rotates.

In the above described related art NC device 101, since the spindle is in selected one of the spindle control mode where the spindle is subjected to the speed command and the c-axis controlling positioning control mode where the position of the spindle is controlled as a contour control axis (NC axis), it is necessary to switch the control of the first spindle 314 and the second spindle 324 to the spindle synchronizing control by outputting the spindle synchronizing control command after selecting the spindle control mode in advance in a case where the NC work machine provided with the first spindle 314 and the second spindle 324 which are arranged oppositely performs cutting works on a single work while the first spindle 314 and the second spindle 324 synchronously rotating in a commanded speed and grasp the work with the two spindles.

Also, since the spindle is in selected one of the spindle control mode where the spindle is subjected to the speed command and the c-axis controlling positioning control mode where the position of the spindle is controlled as a contour control axis (NC axis), it is necessary to switch the control of the first spindle 314 and the second spindle 324 to the NC axis synchronizing control by outputting the NC axis synchronizing control command after the first spindle 314 and the second spindle 324 grasp the work at a given angle in the c-axis controlling positioning control mode selected in advance in a case where the NC work machine provided with the first spindle 314 and the second spindle 324 which are arranged oppositely performs c-axis working such as drilling machining work, milling work, or the like on the side surface (peripheral surface) of the work with rotational tools while synchronously positioning the first spindle 314 and the second spindle 324 at a given angle.

In order to switch the spindle synchronizing control where the synchronous control is performed by the speed command and the NC axis synchronizing control where the synchronous control is performed by the positioning command, it is necessary to switch the mode of the respective spindles to the spindle control mode or c-axis controlling positioning control mode in advance. Therefore, when switching from the spindle synchronizing control to the c-axis synchronizing control the spindle synchronizing control must be canceled. Also, when switching from the c-axis synchronizing control to the spindle synchronizing control the c-axis synchronizing control must be canceled.

When performing the synchronizing control with grasping a single work from both sides by opposing two spindles, if the positioning control gains for both spindles are different, a difference in the theoretical positioning deviation of each spindle arises depending on the speed. Therefore, a torque arises as a result of interporating movement of each spindle of the positioning control and there is a problem that the work is twisted. Because of the problem, it is impossible for the reference spindle and the synchronized spindle under the spindle synchronizing control to switch the control of the spindles to another positioning control. (For example, switching the reference spindle only from the spindle control mode to the c-axis controlling positioning control mode where the positioning control gain is different from that of the spindle control mode). Since it is necessary to cancel the synchronizing control in order to switch the spindle synchronizing control where the synchronizing control is performed by the speed command and the NC axis synchronizing control where the synchronizing control is performed by the positioning command, the synchronization between the two spindles can not be kept. Therefore, the cutting machining works and the machining works by rotational tools (c-axis machining work such as drilling, milling or the like) can not be performed consecutively while grasping the work from both sides by chuck.

In order to perform a secondary machining work on the surface of the work worked by the first spindle 314 after passing the work from the first spindle 314 to the second spindle 324, it is necessary to pass the work after positioning or phase matching for both spindles in advance so as to match the positioning origin of the first spindle 314 and the second spindle 324. Thus, the phase matching takes an operation time.

As a related art NC device addressing a part of the above described problems are proposed (For example, Patent Documents 1, 2). The proposed NC device controls one spindle by the c-axis control so as to back to the c-axis origin by resetting the rotational angle positioning data of the spindle while making the other spindle freely rotatable following the spindle.

Also another proposed NC device determines the angle for the phase matching of the spindle synchronizing control by phase difference calculation so that the chuck position is adjusted to the shape of the deformed work when the NC device grasp the deformed work with the both spindles. Thus the proposed NC device reduces the time cost for the phase matching of the spindle synchronizing control for each machining work cycle (for example Patent Document 3).

RELATED ART REFERENCES

Patent Documents

Patent Document 1: JP-A-H03-239402
Patent Document 2: JP-A-H03-239403
Patent Document 3: JP-A-H10-232705

SUMMARY OF INVENTION

Technical Problem

Although the proposed NC device disclosed in Patent Documents 1, 2, can perform machining works with c-axis control on a single work while grasping the single work by the two spindles, the proposed NC device sometimes has a long cycle time because of temporally canceling of the position control, complex sequences due to synchronizing control for the plurality of spindles, and machining works with timing matching between systems controlling each c-axis by using a lot of queuing controls.

Since the proposed NC device disclosed in Patent Document 3 fixes the positioning origin with reference to the z-phase of the position detector for the second spindle by switching the second spindle to c-axis control after grasping a work, the work position at the c-axis origin of the first spindle and the work position at the c-axis origin of the second spindle are different. Therefore, it is impossible to perform secondary machining works on positions of the work, which are manufactured by the first spindle, by the second spindle.

The present invention is achieved in order to solve the above described problem. The object of the present invention is to provide an NC control method and an NC device to control a NC machining device which is provided with two spindles facing each other so that a lathe machining, a drill machining and mill machining are continuously performed while grasping a single work from both sides by the two spindles. The lathe machining is performed based on a speed command. The drill machining is performed by a rotating tool while positioning the work in a predetermined angle. The mill machining is performed to dig a groove running along the axial direction and the peripheral direction by interpolating the C axis and NC axis, which move a turret or a stage on which the rotating tool is attached, in association with the given speed command.

Also the object of the present invention is to provide a NC control method and a NC device to control a NC machining device which is provided with two spindles facing each other so that the two axes smoothly pass the work without phase matching between the two axes when the NC machining device passes the work from one spindle to the other spindle. Also, the NC control method and the NC device control the NC machining device so that the NC machining device appropriately perform secondary machining with the other spindle on a worked position where the one spindle has performed machining by automatically determining the origin position of the other spindle in the C-axis control.

Means to Solve the Problem

The numerical control method according to the present invention comprises a position control mode for c-axis control controlling a position of one spindle as a contour control axis; and a position control mode for spindle synchronization control synchronously controlling two spindles of a reference spindle and a synchronized spindle, wherein the position control modes control the spindles with a position gain different from each other, and the reference spindle is switched to the contour control axis while keeping the position control mode, which is selected while the both spindles are under the spindle synchronized control, when the reference spindle is subjected to a c-axis control switching command, which handles the reference spindle as the contour control axis, during the rotation of the reference axis and the synchronized axis in a commanded speed given to the reference spindle under the spindle synchronized control.

The numerical control method according to the present invention is a numerical control method where the both spindles are decelerated and stopped while keeping the position control mode, which is selected while the both spindles are under the spindle synchronized control, and after the both spindles are stopped, the position control mode of the both spindles are simultaneously switched from the position control mode for spindle synchronization control to the position control mode for c-axis control, when the reference spindle is subjected to a c-axis control switching command, which handles the reference spindle as the contour control axis during the rotation of the reference axis and the synchronized axis in a commanded speed given to the reference spindle under the spindle synchronized control.

The numerical control method according to the present invention is a numerical control method where, in a case where the reference spindle is subjected to the c-axis control switching command with a phase difference between the reference spindle and the synchronized spindle calculated in advance, further comprising the steps of: calculating a positional shift amount of a c-axis origin of the synchronized spindle based on a positional shift amount of c-axis origin of the reference spindle from a reference point of a position detector, the calculated phase difference, and a positional shift amount of c-axis origin of the synchronized spindle from a reference point of a position detector; and correcting an origin position of the c-axis of the synchronized spindle based on the calculated positional shift amount of the c-axis origin of the synchronized spindle.

The numerical control method according to the present invention is a numerical control method where the phase difference between the reference spindle and the synchronized spindle is calculated from a commanded phase difference between the reference spindle and the synchronized spindle and a subtraction between a positional control deviation of the reference spindle and a positional control deviation of the synchronized spindle.

A numerical control device according to the present invention is installed a position control mode for c-axis control controlling a position of one spindle as a contour control axis; and a position control mode for spindle synchronization control synchronously controlling two spindles of a reference spindle and a synchronized spindle, wherein the position control modes control the spindles with a position gain different from each other. The numerical control device comprising: a spindle control section performing a speed control; an NC axis control section performing a position control as a contour control axis; a spindle-c-axis control switching section switching to the spindle control section at the time of the speed control and switching to the NC axis control section at the time of the contour control; a switching section switching the reference spindle to the contour control axis while keeping a position control mode, which is selected while the both spindles are under the spindle synchronized control, when the reference spindle is subjected to a c-axis control switching command, which handles the reference spindle as the contour control axis, during the rotation of the reference axis and the synchronized axis in a commanded speed given to the reference spindle under the spindle synchronized control.

The numerical control device according to the present invention is a numerical control device the switching section decelerates and stops the both spindles while keeping the position control mode, which is selected while the both spindles are under the spindle synchronized control, and after the both spindles are stopped, the switching section switches position control mode of the both spindles simultaneously from the position control mode for spindle synchronization control to the position control mode for c-axis control, when the reference spindle is subjected to a c-axis control switching command, which handles the reference spindle as the contour control axis during the rotation of the reference axis and the synchronized axis in a commanded speed given to the reference spindle under the spindle synchronized control.

The numerical control device according to the present invention is a numerical control device where the switching section comprising: a spindle position control mode switching section performing switch between the position control mode for the spindle synchronization and the position control mode for c-axis control; a position control mode switching section during spindle synchronization making the spindle position control mode switching section keeping the position control mode, which is selected while the both spindles are under spindle synchronized control, and simultaneously switching the position control mode for the both spindles from the position control mode for the spindle synchronization to the position control mode for the contour axis control after the both spindles stop, when the reference spindle is subjected to a c-axis control switching command, which handles the reference spindle as the contour control axis during the rotation of the synchronized axis in a commanded speed given to the reference spindle under the spindle synchronized control.

The numerical control device according to present invention further comprises: a spindle phase difference calculation section calculating the phase difference between the reference spindle and the synchronized spindle which grasp a single work at the same time; a spindle phase difference memory storing the phase difference calculated by the spindle phase difference calculation section; and a c-axis origin position correction section calculating a positional shift amount of a c-axis origin of the synchronized spindle based on a positional shift amount of c-axis origin of the reference spindle from a reference point of a position detector, the calculated phase difference, and a positional shift amount of c-axis origin of the synchronized spindle from a reference point of a position detector, and correcting an origin position of the c-axis of the synchronized spindle based on the calculated positional shift amount of the c-axis origin of the synchronized spindle.

The numerical control device according to the present invention where the spindle phase difference calculation section calculates the phase difference between the reference spindle and the synchronized spindle from a commanded phase difference between the reference spindle and the synchronized spindle and a subtraction between a positional control deviation of the reference spindle and a positional control deviation of the synchronized spindle.

Advantage of the Invention

According to the present invention, since the both spindles are switched to the C-axis control during the spindle synchronized control for the reference spindle and the synchronized spindle while keeping the position control mode for the both spindles in a same mode, it is possible for an NC machining device, in which the two spindles are provided with facing each other, to consecutively perform a lathe machining based on a speed command, a drill machining, which drills a work positioned at a predetermined angle with a rotating tool, and a mill machining, which interpolates the C-axis and another NC axes moving a turret or blade stage to which the rotating tool are attached in associated with given speed command, while grasping a single work with the both spindles. Therefore, the present invention has an advantage to reduce useless time to switch the machining processes.

According to the present invention, since a phase difference between two spindles while grasping a single work and the origin position of one spindle as a C-axis is corrected relative to the origin position of the other spindle as a C-axis based on the phase difference after the work is passed from the other spindle to the one spindle, it is possible to pass the work without phase matching between the both axes. Therefore, the present invention has an advantage to reduce a time during which no lathe machining run when grasping the work with both spindles.

BRIEF DESCRIPTION OF DRAWINGS

FIG. 3 is a view showing an example of a program in the example of operation of the spindle according to Embodiment 1 of the present invention.

DESCRIPTION OF REFERENCE NUMERALS AND SIGNS

101: NC DEVICE
111: ANALYTICAL PROCESSING SECTION
112: INTERPOLATING CONTROL SECTION
113: NC-AXIS SYNCHRONIZED CONTROL SECTION
121: LADDER CIRCUIT SECTION
122: MECHANICAL CONTROL SIGNAL PROCESSOR SECTION
123: C-AXIS SELECTION SIGNAL
124: POSITION CONTROL MODE SELECTION SIGNAL FOR C-AXIS DURING SYNCHRONIZATION OF SPINDLE
125: CHUCK CLOSURE DETERMINING MEANS
151: SPINDLE SYNCHRONIZING CONTROL SECTION
152: POSITION CONTROL MODE SWITCHING MEANS DURING SYNCHRONIZATION OF SPINDLE
153: SPINDLE PHASE DIFFERENCE CALCULATING MEANS
160: C-AXIS PHASE DIFFERENCE MEMORY
161: C-AXIS ORIGIN COORDINATE CORRECTING MEANS
211, 221: AXIS CONTROL SECTION
212, 222: SPINDLE-C-AXIS CONTROL SWITCHING SECTION
213, 223: SPINDLE CONTROL SECTION
214, 224: NC-AXIS CONTROL SECTION
215, 225: SPINDLE POSITION CONTROL MODE SWITCHING SECTION
311, 321: SPINDLE POSITION CONTROL SECTION
312, 322: SPINDLE MOTOR
313, 223: SPINDLE POSITION DETECTOR

EMBODIMENTS OF INVENTION

Embodiment 1

Hereinafter, Embodiment 1 of the present invention will be described with reference to FIGS. 1 to 3.

Figure 1:
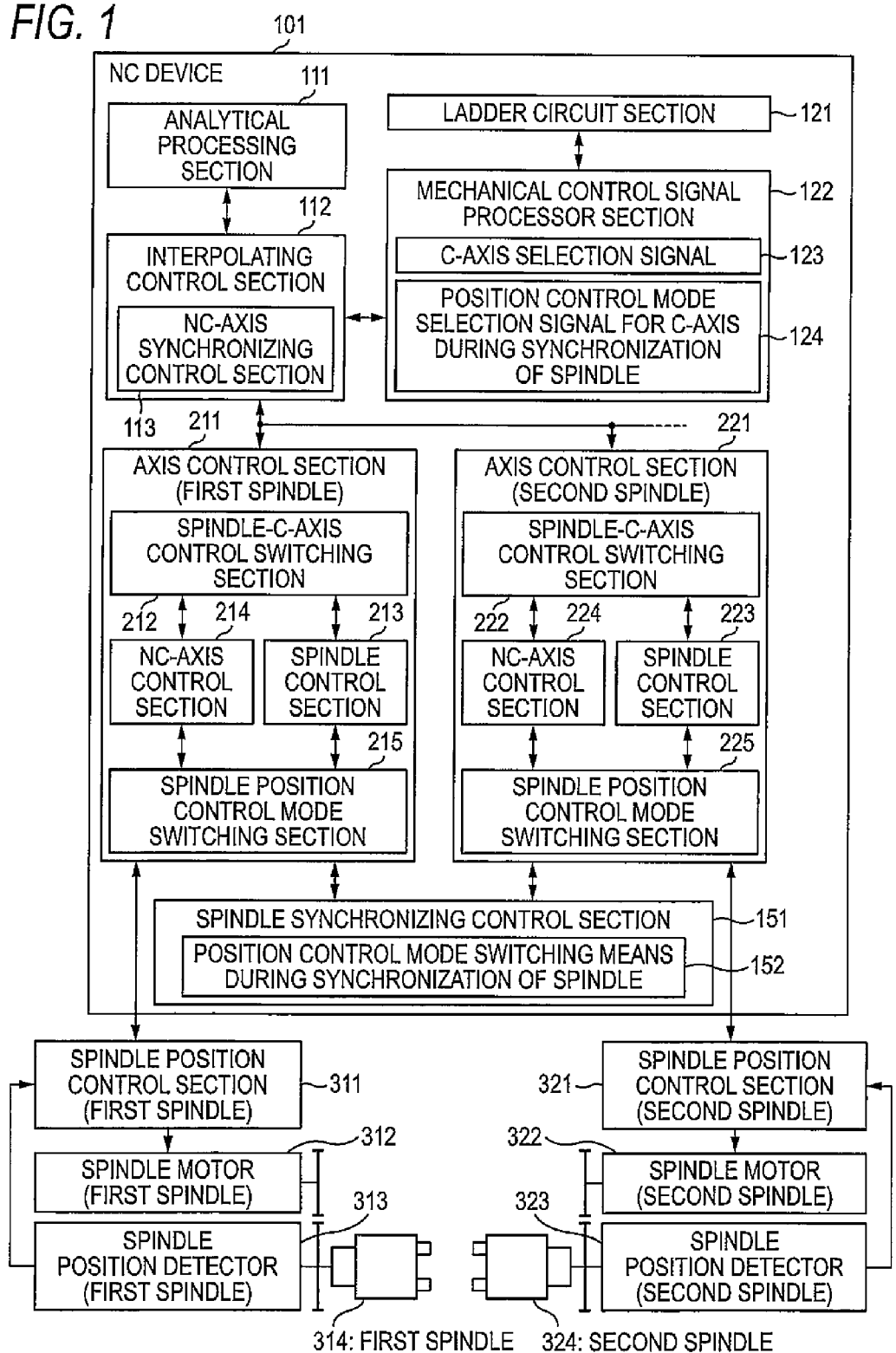
FIG. 1 is a block diagram showing one exemplary configuration of an NC device according to Embodiment 1 of the present invention.
Figure 2:
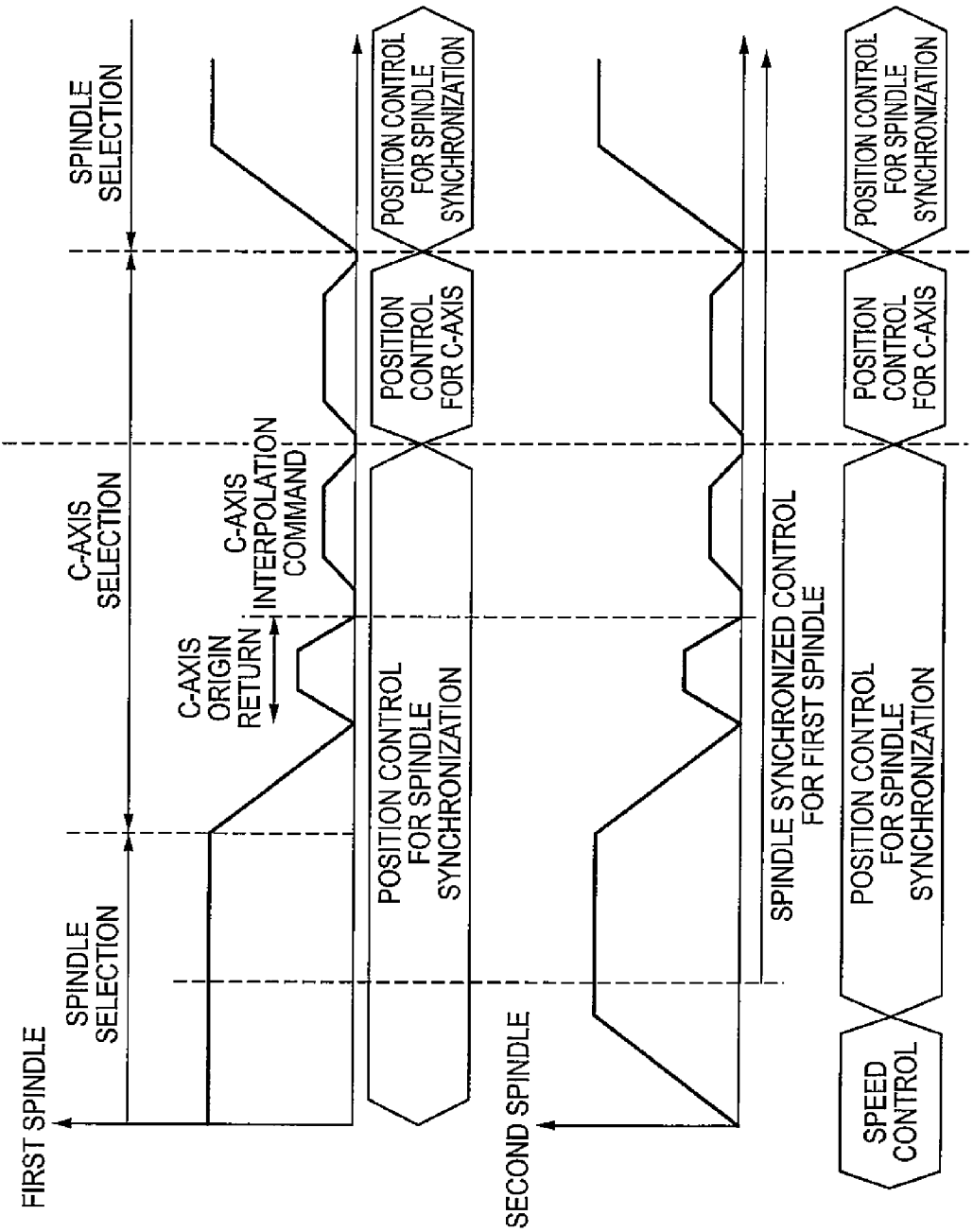
FIG. 2 is a view showing an example of operation of a spindle according to Embodiment 1 of the present invention.

FIG. 1 is a block diagram showing one exemplary configuration of an NC device 101 according to Embodiment 1 of the present invention. Reference numbers in FIG. 1 denote respectively, an analytical processing section 111, interpolating control section 112, an NC-axis synchronizing control section 113, a ladder circuit section 121, a mechanical control signal processor section 122, a C-axis selection signal 123, a position control mode selection signal for C-axis during synchronization of spindle 124, a axis control section 211 of a first spindle 314, a spindle-C-axis control switching section 212 of the first spindle 314, a spindle control section 213 of the first spindle 314, an NC-axis control section 214 of the first spindle 314, a spindle position control mode switching section 215 of the first spindle 314, a axis control section 221 of a second spindle 324, a spindle-C-axis control switching section 222 of the second spindle 324, a spindle control section 223 of the second spindle 324, an NC-axis control section 224 of the second spindle 324, a spindle position control mode switching section 225 of the second spindle 324, a spindle synchronized control section 151, a position control mode switching means during synchronization of spindle 152, a spindle position control section 311 of the first spindle 314, a spindle motor 312 of the first spindle 314, a position detector 313 of the first spindle 314, the first spindle 314, a spindle position control section 321 of the second spindle 324, a spindle motor 322 of the second spindle 324, a position detector 323 of the second spindle 324, and the second spindle 324. The hardware configuration of the NC device 101 is similar to that of a general NC device. Most of the above-mentioned components of the NC device 101 are implemented by software.

The analytical processing section 111 performs an analytical process for a machining work program such as a position command for a positioning of an NC axis, a cutting feed or the like, a speed command for a spindle, an auxiliary command for a machine control, and the like. The interpolating control section 112 receives the result of analysis by the analytical processing section 111 and generates an interpolating position pulse or a speed command for a spindle based on the result of the analysis. The generated interpolating position pulse or the speed command of the spindle is sent to the axis control sections 211, 221 which control corresponding axes. In addition, an auxiliary command code is passed from the analytical processing section 111 to the mechanical control signal processor section 122 through the interpolating control section 112, so that the ladder circuit section 121 is able to control a corresponding auxiliary command corresponding to the code. The NC device 101 has a control section which controls NC axes such as an X axis, a Z axis and so on, FIG. 1 only shows the axis control section 211 which controls the first spindle 314 and the axis control section 221 which controls the second spindle 324, for the purpose of simplicity. The speed and position of the first spindle 314 are controlled by the spindle position control section 311 as the speed and position of the spindle motor 312 for driving the first spindle 314 are controlled by a position feedback signal detected by the spindle position detector 313. The speed and position of the second spindle 324 are controlled by the spindle position control section 321 as the speed and position of the spindle motor 322 for driving the second spindle 324 are controlled by a position feedback signal detected by the spindle position detector 323.

The spindle of the NC device 101 is controlled to be rotated regularly or reversely at a commanded speed when a speed command of a corresponding spindle is generated in the interpolating control section 112 by a S command of the machining work program and a regular rotation signal or an inverse rotation signal with respect to the spindle is output by an M3 or M4 command of the machining work program through the interpolating control section 112, the ladder circuit section 121 and the mechanical control signal processor section 122.

When a C-axis selection signal 123 of the corresponding spindle (which is, for example, generated by an M18 command of the machining work program) is output to the mechanical control signal processor section 122, it is possible to perform a contour control (C-axis control) by switching the corresponding spindle as an NC axis to perform a position command for a positioning, a cutting feed and so on, in cooperating with an NC axis (X axis, Z axis or the like) which drives a blade stage and so on. For example, in a case where a spindle control mode in which a speed control is performed by rotating the spindle based on a speed command is switched to a position control mode for C-axis control in which a position control is performed with the first spindle 314 as the NC axis, the spindle-C-axis control switching section 212 of the spindle 314 passes the axis control from the spindle control section 213, which performs the control according to the speed command, to the NC-axis control section 214 which performs the position control using an interpolating position pulse output from the interpolating control section 112 by outputting the corresponding C-axis selection signal 123 to the first spindle 314.

According to above described switching, the spindle position control mode switching section 215 switches a position control mode of the spindle position control section 311 from the spindle control mode, in which the speed control is performed, to the position control mode for C-axis control in which the position control is performed using a position loop gain for exclusive use of the C-axis control. After the switching, an interpolating position pulse for each NC-axis is generated in association with a position command and a feed speed command issued by the machining work program, so that the command positions of one or more NC-axes is able to be interpolated and moved. The interpolating position pulse output to the NC-axis corresponding to the first spindle 314 is subjected to an acceleration/deceleration process or the like by the NC-axis control section 214 to output the position command corresponding to the spindle position control section 311 for performance of position control. According to this control, a C-axis machining work, such as drilling, milling or the like, using a rotating tool is able to be performed at a flank (circumference) of a work.

When the spindle control mode, in which the speed control is performed by rotating the spindle based on the speed command without controlling the position of the spindle as the NC axis, is selected, if a spindle synchronized control command is issued by the machining work program or the like, the spindle designated as a reference spindle and a synchronized spindle is switched to a position control mode for spindle synchronized control, in which the position control is performed using a position loop gain for exclusive use of the spindle synchronized control. The position of the reference spindle is controlled based on a spindle synchronization position command generated by integrating a given speed command. For example, in a case where the spindle synchronized control is performed with the first spindle 314 as the reference spindle and with the second spindle 324 as the synchronized spindle, the axis control section 211 for the first spindle 314 switches the position control mode of the spindle position control section 311 with the spindle position control mode switching section 215 to the position control mode for spindle synchronized control, in which the position control is performed by using the position loop gain for exclusive use of the spindle synchronized control. The axis control section 221 for the second spindle 324 switches the position control mode of the spindle position control section 321 with the spindle position control mode switching section 225 to the position control mode for spindle synchronized control, in which the position control is performed by using the position loop gain for exclusive use of the spindle synchronization control. The spindle synchronized control section 151 sends the spindle synchronized position command of the reference spindle to the axis control section 221 of the second spindle 324 and controls the position of the second spindle 324 synchronously with the rotation of the reference axis, so that the second spindle 324 rotates in a speed synchronized with the reference axis. At this time, the axis control section 221 of the second spindle 324 is under the spindle synchronized control.

Next, an example operation of the NC device in a case where the C-axis selection signal 123 corresponding to the spindle under the spindle synchronized control is output in the mechanical control signal processor section 122 is described below.

In this case, for example, the first spindle 314 is a reference spindle under the spindle synchronized control and the second spindle 324 is a synchronized spindle under the spindle synchronized control. At the same time, the position control mode for the spindle position control section 311 is the position control mode for the spindle synchronization where the position control is performed by using the position loop gain for exclusive use of spindle synchronized control.

In this example case, when outputting the C-axis selection signal corresponding to the first spindle 314, the spindle-C-axis control switching section 212 of the first spindle 314 switches the spindle control from the spindle control section 213, which controls the spindle by the speed command, to the NC axis control section 214, which controls the spindle by the interpolating position pulse output from the interpolating control section 112. At this time, because of the fact that the first spindle 314 is the reference spindle under the spindle synchronized control, the position control mode switching means 152 during synchronization of spindle provides an information based on which the spindle position control mode switching section 215 keeps the position control mode for the spindle position control section 311 as the position control mode for the spindle synchronization.

While keeping the position control mode, the NC device performs C-axis origin return. After that, the first spindle 314 is positioned in a given angle. During this operation, the second spindle 324 operates synchronously with the position command for the first spindle 314.

There is a case where the position control mode selection signal 124 for C-axis during synchronization of the spindles does not command switching the position control mode of the first spindle, which is the reference axis under the spindle synchronization, to the position control mode for C-axis, when the first spindle 314 and the second spindle 324 are synchronously stopped. In this case, the spindle position control section 311 for the first spindle 314 and the spindle position control section 321 for the second spindle 324, which synchronizes with the first spindle, keep the position control mode as the position control mode for the spindle synchronization where the position control is performed by using the position loop gain for exclusive use of the spindle synchronization.

There is another case where the position control mode selection signal 123 for C-axis during synchronization of the spindles command switching the position control mode of the first spindle, which is the reference axis under the spindle synchronization, to the position control mode for C-axis. In this case, the position control mode switching means 152 during synchronization of spindle receives the command and provides information. Based on the information, the spindle position control mode switching section 215 switches the position control mode of the spindle position control section 311 of the first spindle 314 to the position control mode for C-axis control, in which the position control is performed by using the position loop gain for exclusive use of C-axis control, and the spindle position control mode switching section 225 switches a position control mode of a axis (in this embodiment, the second spindle 324 which is the synchronized spindle) related to the spindle synchronized control to the position control mode for C-axis control in which the position control is performed using the position loop gain for exclusive use of C-axis control.

Then, an interpolating position pulse for each NC-axis is generated in association with a position command and a feed speed command issued by the machining work program, so that the command positions of one or more NC-axes is able to be interpolated and moved. The interpolating position pulse output to the NC-axis corresponding to the first spindle 314 is subjected to an acceleration/deceleration process or the like by the NC-axis control section 214 to output the position command corresponding to the spindle position control section 311 for performance of position control. In synchronization with the first spindle 3134, the second spindle 324, which is the synchronized spindle under the spindle synchronized control, is also operated.

At this time, since the position control mode of the spindle related to the spindle synchronized control is adjusted to a mode designated by the position control mode selection signal 124 for C-axis during synchronization of spindle, it is possible to control the reference spindle under the synchronized position control by the spindle synchronized control such that the command positions of one or more NC-axes is able to be interpolated and moved in association with the position command and a feed speed command issued by the machining work program, like the C-axis control, while grasping a work by the first spindle 314 and the second spindle 324 under the spindle synchronized control.

Next, an example operation of the NC device in case where the spindle synchronized control is commanded for the spindle while the spindle performs a contour control with the NC axis, which drives the blade stage, is described below. In this example operation, the position control mode for the spindle has been switched to the position control mode for C-axis control by outputting the C-axis selections signal 123 in the mechanical control signal processor section 122 and the spindle has performed position commands as an NC axis, such as a positioning, a lathe feeding, or the like.

There is a case where the position control mode for the first spindle 314 is switched to the position control mode for C-axis control. In this case, the spindle-C-axis control switching section 212 for the first spindle 314 switches the spindle control from the spindle control section 213, which controls the spindle by the speed command, to the NC axis control section 214, which controls the position of the spindle by the interpolating position pulse output from the interpolating control section 112, by outputting the C-axis selection signal 123 corresponding to the first spindle 314. According to this switching, the spindle position control mode switching section 215 switches the position control mode of the spindle position control mode 311 from the spindle control mode, which controls the spindle by the speed command, to the position control mode for C-axis control, which controls the spindle by using the position loop gain for exclusive use of the C-axis control. After the switching of the position control mode, an interpolating position pulse corresponding to each NC axis is generated in association with the position command and the feeding speed command designated by the machining program so that the commanded position of one or plurality of NC axes is interpolated and moves. The interpolating position pulse output to the NC axis corresponding to the first spindle 314 is subjected to an acceleration/deceleration process or the like by the NC-axis control section 214 to output the position command corresponding to the spindle position control section 311 for performance of position control.

In the above described example operation, for example, the first spindle 314 is designated as a reference spindle and the second spindle 324 is designated as a synchronized spindle by a machining program or the like with a spindle synchronization command while the control mode of the first spindle 314 is switched to the position control mode for C-axis control.

At this time, there is a case where the position control mode selection signal 124 for C-axis during spindle synchronization does not command the first spindle 314 as the reference spindle under the spindle synchronized control to switch the control mode to the position control mode for C-axis control (In other words, commanded switching to the position control mode for the spindle synchronization). The position control mode switching means 152 during the spindle synchronization receives the command and provides information. Based on the information, the spindle position control mode switching section 215 for the first spindle 314 switches the position control mode of the spindle position control section 311 of the first spindle 314 to the position control mode for the spindle synchronized control, which performs position control by using the position loop gain for exclusive use of the spindle synchronized control. Also, the spindle control section 221 of the second spindle 324, which is the synchronized spindle relative to the first spindle 314, switches the position control mode of the spindle control section 321 by the spindle position control switching section 225 to the position control mode for the spindle synchronized control which performs position control by using the position loop gain for exclusive use of the spindle synchronized control.

The spindle synchronized control section 151 sends the spindle synchronized position command of the reference spindle to the axis control section 221 of the second spindle 324 and controls the position of the second spindle 324 synchronously with the rotation of the reference axis, so that the second spindle 324 rotates in a speed synchronized with the reference axis. Then, the axis control section 221 of the second spindle 324 is under the spindle synchronized control. At this time, an interpolating position pulse for each NC-axis is generated in association with a position command and a feed speed command issued by the machining work program so that the command positions of one or more NC-axes is able to be interpolated and moved. The interpolating position pulse output to the NC-axis corresponding to the first spindle 314 is subjected to an acceleration/deceleration process or the like by the NC-axis control section 214 to output the position command corresponding to the spindle position control section 311 for performance of position control. In synchronized with this, the second spindle 324, which is the synchronized spindle under the spindle synchronized control, is also operated.

In the above described example operation, for example, the first spindle 314 is designated as a reference spindle and the second spindle 324 is designated as a synchronized spindle by a machining program or the like with a spindle synchronization command while the control mode of the first spindle 314 is switched to the position control mode for C-axis control.

At this time, there is a case where the position control mode selection signal 124 for C-axis during spindle synchronization commands the first spindle 314 as the reference spindle under the spindle synchronized control to switch the control mode to the position control mode for C-axis control (In other words, not commanded switching to the position control mode for the spindle synchronization). The position control mode switching means 152 during synchronization of spindle causes the spindle position control mode switching section 215 of the first spindle 314 to keep the position control mode of the spindle position control section 311 of the first spindle 314 at the position control mode for C-axis control in which the position control is performed by using the position loop gain for exclusive use of C-axis control.

Since it is selected for the first spindle, which is the reference spindle under the spindle synchronization control, to switch to the position control mode for C-axis control by the position control mode selection signal 124 for C-axis during synchronization of spindle, the axis control section 221 of the second spindle 324, which is the synchronized spindle for the first spindle 314 switches the position control mode of the spindle position control section 321 to the position control mode for C-axis control in which the position control is performed by using the position loop gain for exclusive use of C-axis control by the spindle position control mode switching section 225.

The axis control section 221 of the second spindle 324 performs the position control in synchronization with a C-axis movement command of the reference spindle by receiving a spindle synchronization position command transferred by the spindle synchronized control section 151. An interpolating position pulse for each NC-axis is generated in association with a C-axis position command and a feed speed command of the reference spindle issued by the machining work program, so that the command positions of one or more NC-axes is able to be interpolated and moved. The interpolating position pulse output to the NC-axis corresponding to the first spindle 314 is subjected to an acceleration/deceleration process or the like by the NC-axis control section 214 to output the position command corresponding to the spindle position control section 311 for performance of position control. In synchronization with this, the second spindle 324, which is the synchronized spindle under the spindle synchronized control, is also operated.

When the C-axis selection signal 123 of the first spindle 314, which is the reference spindle, is turned off within the above described condition under the spindle synchronized control, the spindle-C-axis control switching section 212 of the first spindle 314, which is the reference spindle, switches the axis control from the NC-axis control section 214, which performs the position control using the interpolating position pulse output from the interpolating control section 112, to the spindle control section 213 which performs the control according to the speed command. At this time, the position control mode switching means 152 during synchronization of spindle causes the spindle position control mode switching section 215 of the first spindle 314 to switch the position control mode of the spindle position control section 311 to the position control mode for spindle synchronized control in which the position control is performed by using the position loop gain for exclusive use of spindle synchronized control.

At the same time, the spindle position control mode switching section 225 of the second spindle 324, which is in synchronization with the first spindle 314, switches the position control mode of the spindle position control section 321 to the position control mode for spindle synchronized control in which the position control is performed by using the position loop gain for exclusive use of spindle synchronized control. The first spindle 314 rotates based on the speed command for the fist spindle 314, which is the reference mains axis, and the second spindle 324, which is the spindle synchronized with the first spindle 314, rotates while synchronized with the position of the first spindle. The spindles designates as the reference spindle and the synchronized spindle are simultaneously switched to the position control mode for spindle synchronized control where the position control is performed using the position loop gain for exclusive use of spindle synchronized control and are under the spindle synchronized control.

Next, a concrete operation of the NC device 101 configured as shown in FIG. 1 is described below with reference to FIGS. 2 and 3. FIG. 2 shows an operation of the first spindle 314 and the second spindle 324 when a program shown in FIG. 3 is executed. The first spindle 314 is rotated at a speed of 4000 min$^{-1}$ based on a command of an N10 block. A spindle synchronized control is performed based on a command of an N20 block with the first spindle 314 as the reference spindle and with the second spindle 324 as the synchronized spindle. At this time, the first spindle 314 is switched to the position control for spindle synchronization. Also, the second spindle 324 is rotated in a commanded speed of the first spindle 314 and switched to the position control for spindle synchronization. When the rotation speed of the first spindle 314 and the second spindle 324 are equal, the first spindle 314 and the second spindle 324 are under the spindle synchronized control. After completion of the spindle synchronization, the second spindle 324 moves forward based on a command of an N30 block and a work is chucked while the second spindle 324 is being rotated. Thereafter, while both of the first spindle 314 and the second spindle 324 are grasping one work from both sides by means of a chuck, a lathe turning machining work is performed. Here, however, a program for the lathe turning machining work is omitted for the purpose of simplification of description. After the lathe turning machining work is completed, the first spindle 314, which is the reference spindle, is selected as C-axis control and performs an origin return to a C-axis origin position of the first spindle 314 based on a command of an N40 block. At this time, the second spindle 324 performs follows the operation of the first spindle in synchronization with the position command for the origin return operation of the first spindle 314.

Next, in a case where the C-axis control mode is not selected by the position control mode selection signal 124 for C-axis during synchronization of spindle based on a command of N50 block, the first spindle 314 consecutively moves based a C-axis interpolation command (in this program, moves to a position rotated by 90° from the C-axis origin position) and the second spindle 324 also moves consecutively in synchronized with the C-axis interpolation movement of the first spindle 314 while both of the first spindle 314 and the second spindle 324 keep the position control mode for spindle synchronization.

Next, in a case where the C-axis control mode is selected by the position control mode selection signal 124 for C-axis during synchronization of spindle based on a command of an N51 block, both of the first spindle 314 and the second spindle 324 are simultaneously switched to the position control for C-axis while both of the first spindle 314 and the second spindle 324 stopped, and the second spindle 324 moves in synchronization with the movement of the first spindle 314 based on the C-axis interpolation command. At the time of such movement of the first spindle 314 and the second spindle 324, a C-axis machining work such as drilling, milling or the like is performed for a flank of a work, although it is omitted in the program. When the C-axis selection of the first spindle 314 is released based on a command of an N60 block, both of the first spindle 314 and the second spindle 324 are simultaneously switched to the position control for spindle synchronization with both of the first spindle 314 and the second spindle 324 stopped. Then the first spindle 314 returns to the rotation according to the speed command, and the second spindle 324 is rotated in synchronization with the rotation of the first spindle 314 in a speed synchronized with the first spindle 314.

As described above, the synchronized spindles synchronously operate in synchronized with the rotation synchronization based on the speed command or the interpolating movement based on the interpolating position command for the C-axis of the reference spindle, while the first spindle 314 and the second spindle 324 keep the spindle synchronized control and grasp a single work from both sides simultaneously.

According to the above-described Embodiment 1, when the C-axis control command is issued to the reference spindle under the spindle synchronized control, since both of the reference spindle and the synchronized spindle is able to be switched to the C-axis interpolation command operation with both of the reference spindle while keeping the position control gain, it is possible to smoothly switch from the spindle control by the speed command to the position control by the C-axis command in a state where a single work is grasped from both sides by synchronized rotation of the first spindle 314 and the second spindle 324.

Embodiment 2

Next, Embodiment 2 of this invention is described below with reference to FIGS. 4 to 7.

Figure 4:
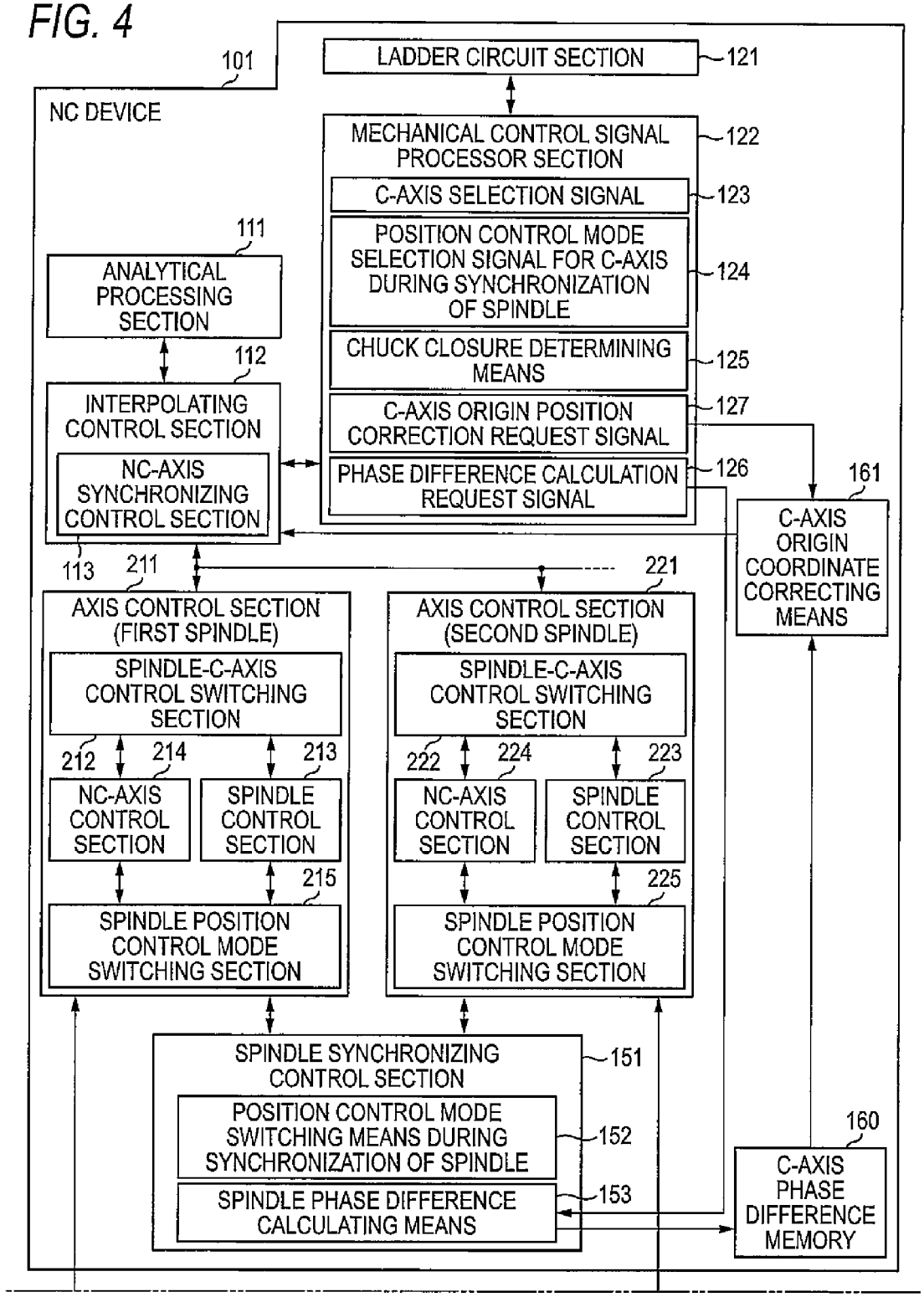
FIG. 4 is a block diagram showing one exemplary configuration of an NC device according to Embodiment 2 of the present invention.

FIG. 4 shows one exemplary configuration of the NC device 101 according to Embodiment 2 of the present invention, where a chuck closure determining means 125, a spindle phase difference calculating means 153, a C-axis phase difference memory 160 and a C-axis origin coordinate correcting means 161 are added to the NC device 101 described in Embodiment 1.

The chuck closure determining means 125 determines whether or not a chuck is closed by checking a chuck open/closure signal output from the ladder circuit section 121.

Next, operation of the NC device 101 configured as above is described below with reference to FIGS. 5, 6 and 7. Here, operation of the added chuck closure determining means 125, spindle phase difference calculating means 153, C-axis phase difference memory 160 and C-axis origin coordinate correcting means 161 are mainly described, and since other components have the same operation as those described in Embodiment 1, explanations of which are omitted.

Figure 5:
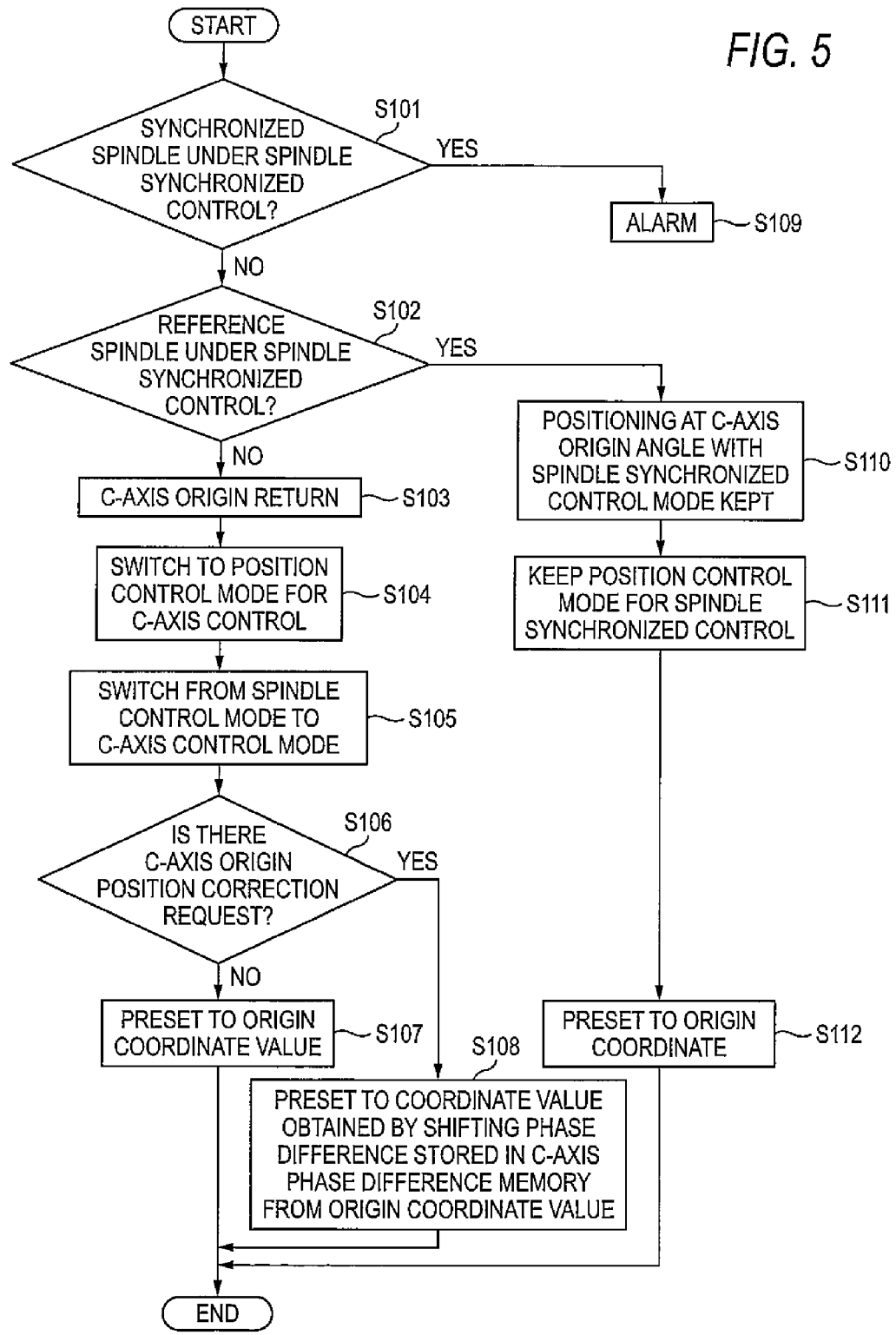
FIG. 5 is a flow chart for explaining an operation in selecting a C-axis control of a spindle according to Embodiment 2 of the present invention.

FIG. 5 is a flow chart for explaining an operation in selecting a C-axis control of a spindle in the NC device 101 according to the configuration in Embodiment 2.

When the C-axis selection signal 123 to switch the spindle to the C-axis control is output, the spindle-C-axis control switching sections 212 and 222 determine whether or not the spindle is the synchronized spindle under spindle synchronized control in Step S101. If the spindle is the synchronized spindle under spindle synchronized control, since the spindle synchronized control has precedent, an alarm process is performed in Step S109. Next, in Step S102, it is determined whether or not the spindle is the reference spindle under spindle synchronized control. If the spindle is not the reference spindle under spindle synchronized control, since it is able to be determined that the spindle is not the spindle under spindle synchronized control, a C-axis origin return is performed in Step S103. In Step S104, the spindle position control mode switching sections 215 and 225 switch the position control mode of the spindle to the position control mode for C-axis control in which the position control is performed by using a position loop gain for exclusive use of C-axis control. Following this, in Step S105, the spindle is switched from the spindle control mode to the position control mode for C-axis control.

Next, in Step S106, the C-axis origin coordinate correcting means 161 determines whether or not there is a request for C-axis origin position correction by checking the C-axis origin position correction request signal 127 of the mechanical control signal processor section 122. If there is no request for C-axis origin position correction, the C-axis coordinate value is set to an origin coordinate value in Step S107. If there is a request for C-axis origin position correction, the C-axis coordinate value is set to the coordinate value shifted from the origin coordinate value in phase difference pre-stored in the C-axis phase difference memory 160 in Step S108. In addition, if it is determined in Step S102 that the spindle is the reference spindle under spindle synchronized control, the spindle-C-axis control switching sections 212 and 222 switch a position command of the spindle to the NC-axis control sections 214 and 224 and performs a positioning for a C-axis origin in Step S110. At this time, in Step S111, the spindle position control mode switching sections 215 and 225 keep the position control mode of the spindle at the position control mode for spindle synchronized control in which the position control is performed using a position loop gain for spindle synchronized control. In Step S112, a C-axis coordinate value is set to the origin coordinate.

Figure 6:
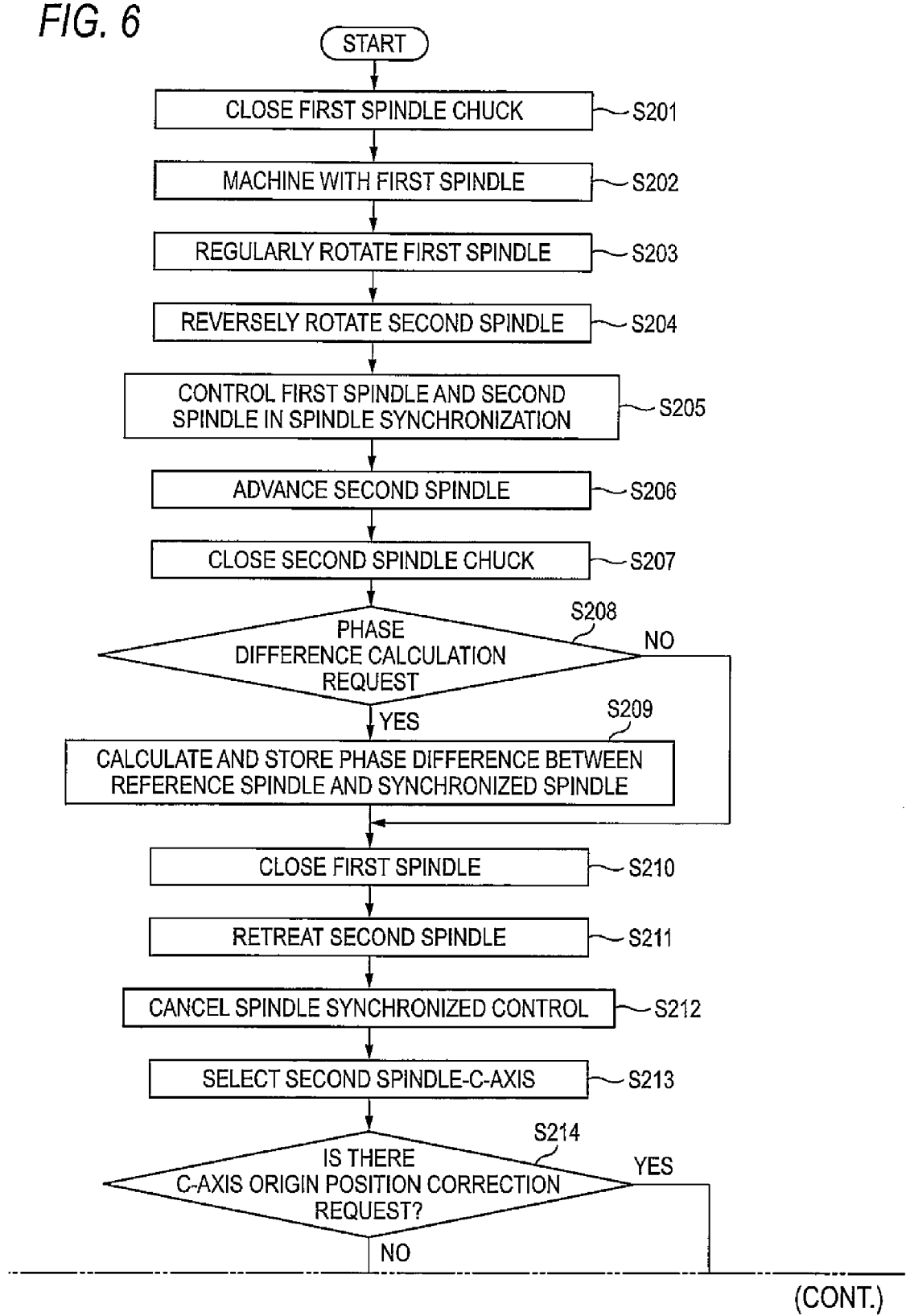
FIG. 6 is a flow chart for explaining a transfer of work from a first spindle to a second spindle according to Embodiment 2 of the present invention.

FIG. 6 is a flow chart for explaining an operation example where work is transferred from the first spindle 314 to the opposing second spindle 324 in an NC device tool controlled by the NC device 101 according to Embodiment 2. In Step S201, a chuck of the first spindle 314 is closed and a work is grasped. In Step S202, the work grasped by the first spindle 314 is machined. Next, in order to transfer work from the first spindle 314 to the second spindle 324 from a state where the first spindle 314 is forward rotated in Step S203, the opposing second spindle 324 is reversely rotated in Step S204 and a spindle synchronized control is performed between the first spindle 314 and the second spindle 324 in Step S205. At this time, if the work does not require a specific position at which the work is grasped by the second spindle 324, a phase adjustment is not necessary.

When the second spindle 324 approaches at a position where the second spindle can grasp the work by advancing the stage of the second spindle 324 in step S206, a chuck of the second spindle 324 is closed in Step 207. Accordingly, the first spindle 314 and the second spindle 324 rotate synchronously while grasping a single work together.

Next, in Step S208, the spindle phase difference calculating means 153 checks a phase difference calculation request signal 126. If there is a phase difference calculation request, a phase difference between the first spindle 314 (reference spindle) and the second spindle 324 (synchronized spindle) is calculated and a phase difference between the C-axis origin of the first spindle 314 and the C-axis origin of the second spindle 324 is stored in the C-axis phase difference memory 160 in Step S209. Next, in Step S210, the chuck of the first spindle 314 is opened and the first spindle 314 releases the grasped work. In a case of an automatic lathe, the work may be cut by a cut-through bite and passed to the second spindle 324 while the chuck of the first spindle 314 is closed. Thereafter, the stage of the second spindle 324 moves backward in Step S211, a spindle synchronization is cancelled in Step S212, and a machining in the second spindle 324 is initiated. When a C-axis of the second spindle 324 is selected in Step S213, the C-axis origin coordinate correcting means 161 checks the C-axis origin position correction signal 127 to determine whether or not there is a request for C-axis origin position correction in Step S214. In a case, such as performing the phase adjustment in advance in Step S205, where a C-axis origin position correction is not necessary, a C-axis origin return of the second spindle 324 is normally performed to preset the C-axis to the origin coordinate value in Step S215. In a case where the phase difference is stored in Step S209 and the C-axis origin position correction is to be performed, after the second spindle 324 is returned to the C-axis origin position, in Step S216, the C-axis origin coordinate correcting means 161 presets the C-axis coordinate value to a coordinate value shifted from the origin coordinate value in the C-axis phase difference stored in the C-axis phase difference memory in step S209 and then corrects a C-axis origin coordinate value. Thereafter, in Step S217, the second spindle 324 performs a machining work by performing the C-axis control of the second spindle 324 based on an interpolation command issued by a program.

Figure 7:
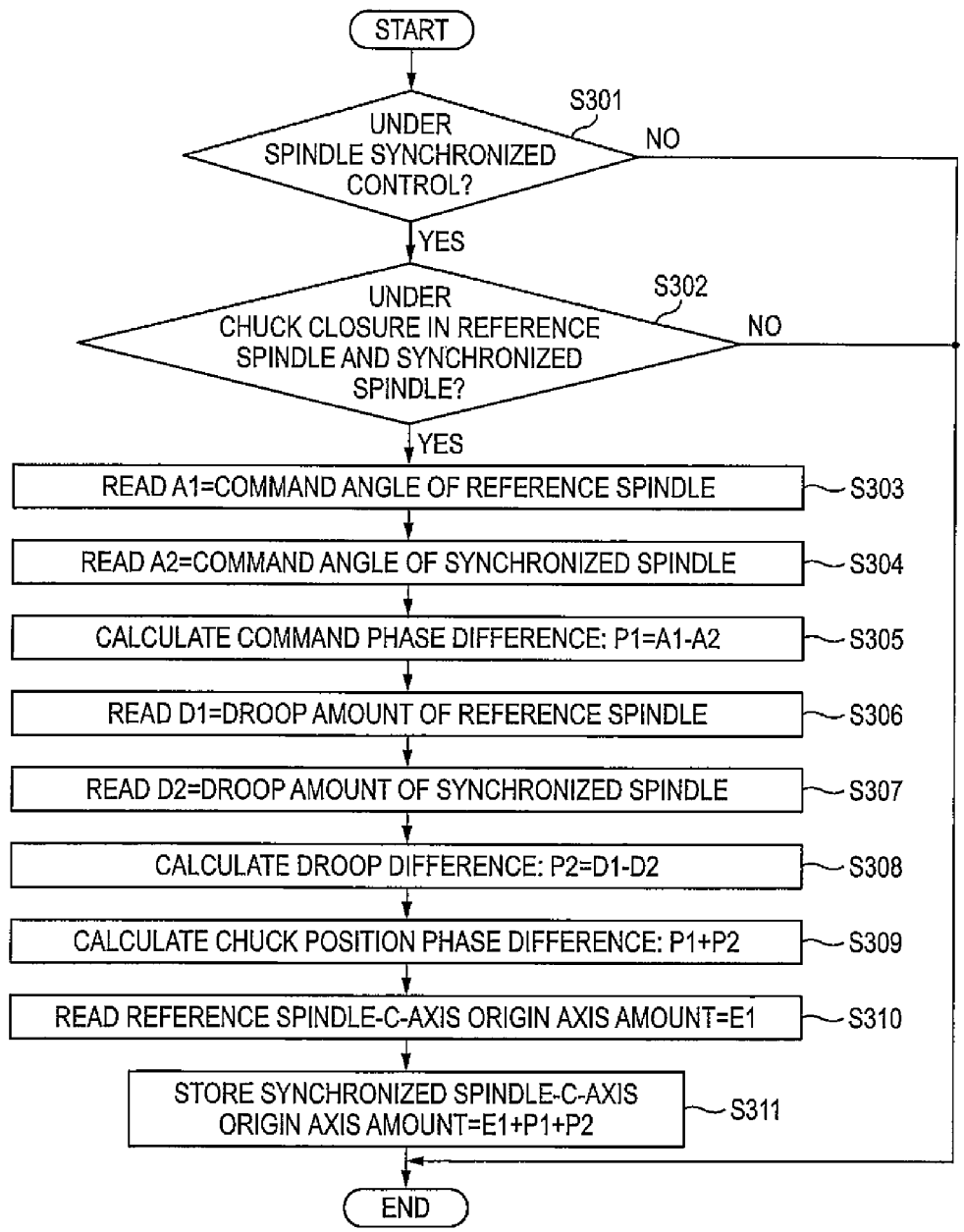
FIG. 7 is a flow chart for explaining a spindle phase difference calculation according to Embodiment 2 of the present invention.
Figure 8:
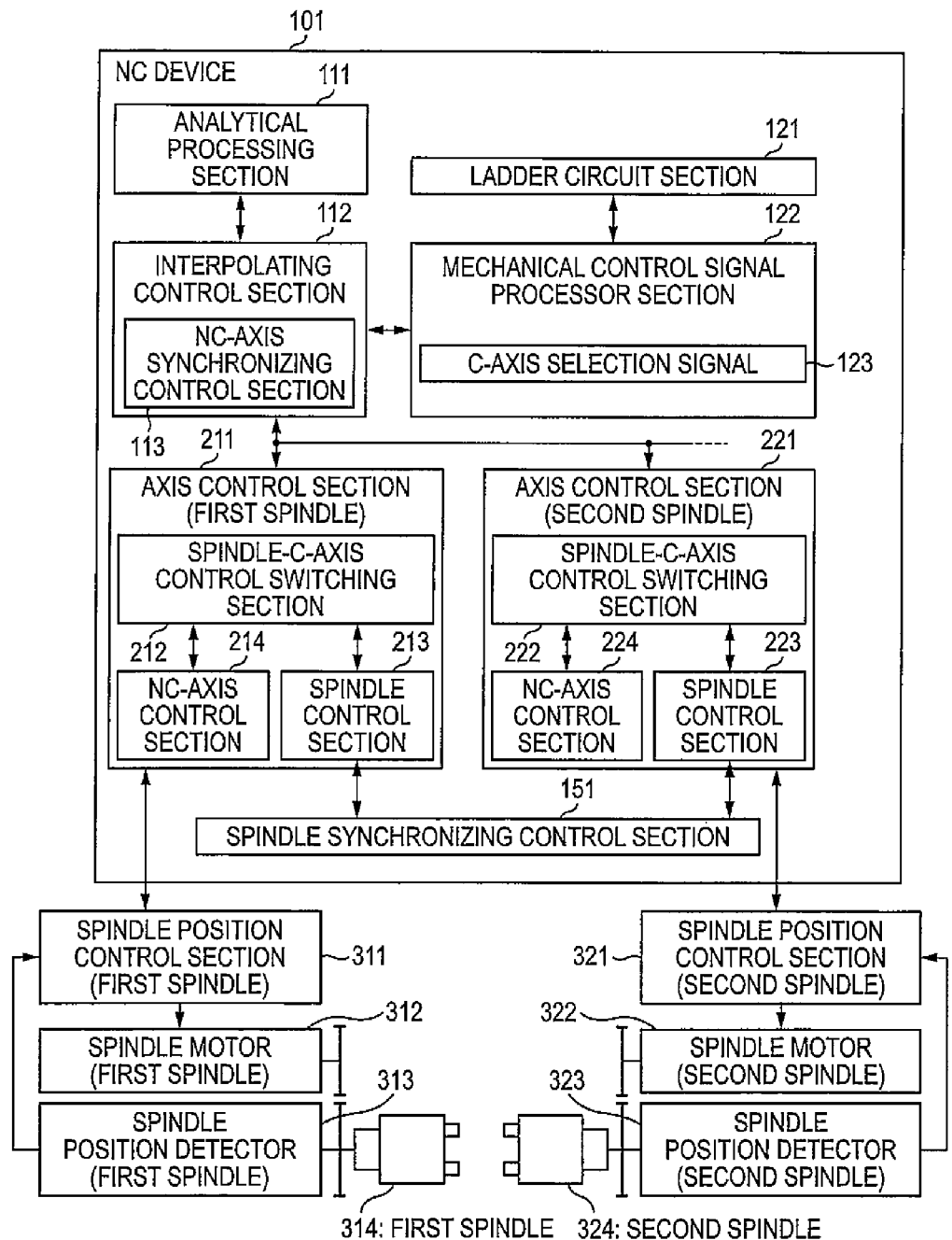
FIG. 8 is a block diagram showing a configuration of a conventional NC device.

FIG. 7 is a flow chart for a calculation of a phase difference by the spindle phase difference calculating means 153 when the phase difference between the first spindle 314 (reference spindle) and the second spindle 324 (synchronized spindle) is calculated in Step S209 of FIG. 6. In Step S301, it is checked whether or not the first spindle 314 and the second spindle 324 are under spindle synchronized control. If both axes are under spindle synchronized control, in Step S302, the chuck closure determining means 125 checks whether or not the reference spindle and the synchronized spindle grasp a single work and are under spindle synchronized control while the chucks of both of the first spindle 314 and the second spindle 324 closed. If the check is affirmative, in Step S303, a command angle A1 within one rotation of a position command for the reference spindle is read from a spindle synchronization position command of the reference spindle. At the same time, in Step S304, a command angle A2 within one rotation of a position command for the synchronized spindle is read from a spindle synchronization position command of the synchronized spindle, and in Step S305, the difference angle between the command angle A1 within one rotation of the reference spindle and the command angle A2 within one rotation of the synchronized spindle is calculated to produce a phase difference P1 of the command angles in the spindle synchronized control of the first spindle 314 and the second spindle 324.

In addition, in order to calculate a relative angle between a chuck position of the first spindle 314 and a chuck position of the second spindle 324 with high precision, the amount of following delay (hereinafter referred to as a droop amount) of the spindle position control of the reference spindle is read in Step S306, and at the same time, the droop amount of the synchronized spindle is read in Step S307. In Step S308, by calculating the difference between the droop amount of the reference spindle and the droop amount of the synchronized spindle, a degree of distortion P2 of the chuck position which is generated when a work is chucked by the second spindle 324 under a state of a command synchronization by the spindle synchronized control is produced. In Step S309, the spindle phase difference calculating means 153 calculates a phase difference between the chuck position viewed from a Z-phase reference point of the first spindle 314 and the chuck position viewed from a Z-phase reference point of the second spindle 324 by adding P1 and P2. In addition, In Step S310, when the C-axis of the first spindle 314 (reference spindle), an origin shift amount E1 of a C-axis coordinate system from the Z-phase reference point, which is set by a parameter or the like, is read, and in Step S311, in a state where the reference spindle and the synchronized spindle grasp one work and are under synchronization control, an origin shift amount of a C-axis coordinate of the synchronization, which corresponds to the C-axis origin coordinate, is calculated by E1+P1+P2 and is stored in the C-axis phase difference memory 160. In the above course of calculating the phase difference, when the opposing spindles are rotated in synchronization to grasp one work, since a rotation polarity of each spindle may be in a reverse direction, it is to be understood that the phase difference is required to be calculated in consideration of a synchronization polarity.

According to the above-described Embodiment 2, by correcting the C-axis origin shift amount of the second spindle 324 in Step S216 of FIG. 6 based on the C-axis phase difference calculated as above, since the C-axis coordinate system of the synchronized spindle is able to be set from the phase difference during the spindle synchronized control in the reference spindle and the synchronized spindle so that the C-axis origin of the synchronized spindle coincides with the C-axis origin of the reference spindle, the phase adjustment may not be performed for the spindle synchronized control in Step S205. By subjecting the spindle to the acceleration/deceleration process, since time required to perform the phase adjustment is able to be reduced, it is possible to reduce time required to transfer work.

According to the first invention, when the C-axis control switching command for the reference spindle under spindle synchronized control is issued, since the position control mode of the relevant spindle is kept at the position control mode for spindle synchronized control without being switched to the position control mode for C-axis control and the position command for the synchronized spindle is configured to be synchronized with the position command for the reference spindle, the reference spindle is able to be switched to the C-axis control from a state where the reference spindle and the synchronized spindle grasp the same work and are rotated in synchronization at a command speed, and accordingly, with one work grasped by the spindle in opposition to each other, a prompt switching is able to be made between a lathe turning machining work by the spindle synchronized control and a machining work such as drilling, milling or the like of a flank of the work by the C-axis control, which may result in elimination of wasted time.

According to the second invention, when the C-axis control switching command for the reference spindle under spindle synchronized control is issued, since the position control mode of the relevant spindle is kept at the position control mode for spindle synchronized control without being switched to the position control mode for C-axis control, the position command for the synchronized spindle is configured to be synchronized with the position command for the reference spindle, the reference spindle is switched to the profile control axis, and, after the reference spindle and the synchronized spindle are stopped, position control gains of both of the spindles are configured to be switched to the position control gain for C-axis control, the reference spindle is able to be switched to the C-axis control from a state where the reference spindle and the synchronized spindle grasp the same work and are rotated in synchronization at a command speed, and accordingly, with one work grasped by the spindle in opposition to each other, a prompt switching is able to be made between a lathe turning machining work by the spindle synchronized control and a machining work such as drilling, milling or the like of a flank of the work by the C-axis control, which may result in elimination of wasted time and achievement of responsiveness equivalent to a C-axis control in a single spindle for a cutting load under C-axis control.

According to the third invention, since the difference between a work grasping position of the first spindle 314 and a work grasping position of the second spindle 324 is calculated and the C-axis origin position of the second spindle 324 is corrected to be a position obtained by adding the phase difference between the first spindle 314 and the second spindle 324 to the C-axis origin position of the first spindle 314, one work is able to continue to be machined by the second spindle 324 to which the first spindle 314 is switched, without adjusting a phase between both of the spindles before the work is grasped by the first spindle 314 and the second spindle 324, which may result in elimination of time required to adjust the phase between both of the spindles and hence improvement of production efficiency.

According to the fourth invention, since the phase difference between the first spindle 314 and the second spindle 324, which grasp one work, is calculated from a command phase difference between the reference spindle and the synchronized spindle, which are under spindle synchronized control, and the difference between an amount of position control deviation of the reference spindle and an amount of position control deviation of the synchronized spindle, the phase difference between both of the spindles is able to be calculated with high precision, and accordingly, the origin position after a work is passed is able to be determined with higher precision.

INDUSTRIAL APPLICABILITY

The numerical control method and the numerical control machine are adaptable to be used for control of an NC lathe with a first spindle and a second spindle mounted in opposition to each other.

The invention claimed is:

1. A method for numerical control which has a position control mode for C-axis control in which a position control is performed with a spindle as a profile control axis, and a position control mode for spindle synchronized control in which both of a reference spindle and a synchronized spindle are controlled in synchronization, the position control modes controlling the spindles using different position control gains, wherein:

when the reference spindle and the synchronized spindle are controlled in spindle synchronization and a C-axis control switching command to treat the reference spindle as the profile control axis is issued during a rotation at a command speed given to the reference spindle, the reference spindle is switched to the profile control axis with both of the spindles keeping the position control mode selected during the spindle synchronized control, and when the reference spindle and the synchronized spindle are controlled in spindle synchronization, and a C-axis control switching command, which treats the reference spindle as the profile control axis, is issued during rotation of the reference spindle, both of the spindles are decelerated and stopped, with both of the spindles keeping the position control mode selected during the spindle synchronized control, and the position control modes of both of the spindles are simultaneously switched from the position control mode for spindle synchronization to the position control mode for C-axis control after both of the spindles are stopped.

2. The method according to claim 1, wherein a phase difference between the reference spindle and the synchronized spindle is calculated in advance during the spindle synchronized control, and, when a command of switching of the synchronized spindle to the C-axis control is issued, an amount of C-axis origin position shift of the synchronized spindle is calculated from an amount of C-axis origin shift from a position detector reference point of the reference spindle, the calculated phase difference, and an amount of C-axis origin shift from a position detector reference point of the synchronized spindle, and the C-axis origin position of the synchronized spindle is corrected based on the calculated amount of C-axis origin position shift of the synchronized spindle.

3. The method according to claim 2, wherein the phase difference between the reference spindle and the synchronized spindle is calculated from a command phase difference between the reference spindle and the synchronized spindle and a difference between an amount of position control deviation of the reference spindle and an amount of position control deviation of the synchronized spindle.

4. A numerical control machine which has a position control mode for C-axis control in which a position control is performed with a spindle as a profile control axis, and a position control mode for spindle synchronized control in which both of a reference spindle and a synchronized spindle are controlled in synchronization, the position control modes controlling the spindle using different position control gains, comprising:
a spindle control section which performs a speed control;
an NC-axis control section which performs a position control with the profile control axis;
a spindle-C-axis control switching section which is switched to the spindle control section in performing a speed control and is switched to the NC-axis control section in performing a profile control; and
a switch for switching the reference spindle to the profile control axis with both of the spindles keeping the position control mode selected during the spindle synchronized control when the reference spindle and the synchronized spindle are controlled in spindle synchronization and a C-axis control switching command to treat the reference spindle as the profile control axis is issued during a rotation of the synchronized spindle at a command speed given to the reference spindle.

5. The numerical control machine according to claim 4, wherein, when the reference spindle and the synchronized spindle are controlled in spindle synchronization and a C-axis control switching command to treat the reference spindle as the profile control axis is issued during a rotation at a command speed given to the reference spindle, the switch decelerates and stops both of the spindles, with both of the spindles keeping the position control mode selected during the spindle synchronized control, and simultaneously switching position control modes of both of the spindles from the position control mode for spindle synchronization to the position control mode for C-axis control after both of the spindles are stopped.

6. The numerical control machine according to claim 5, wherein the switch includes:
a spindle position control mode switching section which performs switching between the position control mode for spindle synchronization and the position control mode for C-axis control; and
a position control mode switch during spindle synchronization for keeping both of the spindles at the position control mode selected during the spindle synchronized control for the spindle position control mode switching section, and simultaneously switching position control modes of both of the spindles from the position control mode for spindle synchronization to the position control mode for C-axis control after both of the spindles are stopped when the reference spindle and the synchronized spindle are controlled in spindle synchronization and a C-axis control switching command to treat the reference spindle as the profile control axis is issued during a rotation of the synchronized spindle at a command speed given to the reference spindle.

7. The numerical control machine according to any one of claims 4 to 6, further comprising:
a spindle phase difference calculator for calculating a phase difference between the reference spindle and the synchronized spindle which grasp one work simultaneously;
a spindle phase difference memory which stores the phase difference calculated by the spindle phase difference calculator; and
a C-axis origin position corrector for calculating an amount of C-axis origin position shift of the synchronized spindle from an amount of C-axis origin shift from a position detector reference point of the reference spindle, the stored phase difference, and an amount of C-axis origin shift from a position detector reference point of the synchronized spindle when a command of switching of the synchronized spindle to the C-axis control is issued, and correcting the C-axis origin position of the synchronized spindle based on the calculated amount of C-axis origin position shift of the synchronized spindle.

8. The numerical control machine according to claim 7, wherein the spindle phase difference calculator calculates the phase difference between the reference spindle and the synchronized spindle from a command phase difference between the reference spindle and the synchronized spindle and a difference between an amount of position control deviation of the reference spindle and an amount of position control deviation of the synchronized spindle.

* * * * *